(12) United States Patent
Rohde et al.

(10) Patent No.: US 8,708,356 B2
(45) Date of Patent: Apr. 29, 2014

(54) PIVOT BEARING WITH TURNED DAMPER CLAMPING

(71) Applicant: Georg Fischer Automotive AG, Schaffhausen (CH)

(72) Inventors: Thomas Rohde, Neukirchen-Vluyn (DE); Stefan Hess, Buesingen (CH); Dominik Mahnig, Schaffhausen (CH)

(73) Assignee: Georg Fischer GmbH, Mettmann (DE)

( * ) Notice: Subject to any disclaimer, the term of this patent is extended or adjusted under 35 U.S.C. 154(b) by 0 days.

(21) Appl. No.: 13/742,029

(22) Filed: Jan. 15, 2013

(65) Prior Publication Data

US 2013/0181421 A1 Jul. 18, 2013

(30) Foreign Application Priority Data

Jan. 16, 2012 (EP) .................................. 12151236

(51) Int. Cl.
*B62D 7/18* (2006.01)
(52) U.S. Cl.
USPC ................................ 280/93.512; 280/124.145
(58) Field of Classification Search
CPC .. B60F 13/006; B60F 15/07; B60F 2204/129; B60F 2206/50; B60F 2206/8111; B62D 7/18
USPC ....................... 280/93.512, 124.125, 124.145, 280/124.146, 124.154
See application file for complete search history.

(56) References Cited

U.S. PATENT DOCUMENTS

| 4,627,667 A | 12/1986 | Mahnig et al. |
| 6,367,830 B1 * | 4/2002 | Annequin et al. ........ 280/93.512 |
| 7,490,840 B2 * | 2/2009 | Luttinen et al. .......... 280/93.512 |
| 2004/0140640 A1 * | 7/2004 | Frantzen et al. ........ 280/124.107 |

FOREIGN PATENT DOCUMENTS

| CH | 659442 A5 | 1/1987 |
| DE | 10212873 B4 | 10/2003 |
| DE | 102005040101 A1 | 3/2007 |

\* cited by examiner

*Primary Examiner* — Ruth Ilan
(74) *Attorney, Agent, or Firm* — Bachman & LaPointe, P.C.

(57) ABSTRACT

Pivot bearing for a wheel suspension, in particular for a front axle of a motor vehicle, containing a wheel bearing receiver, a steering arm, a spring strut receiver with a damper clamping and a carrier rib, wherein the damper clamping of the spring strut receiver faces the vehicle outside and the pivot bearing has an opening in the region between the wheel bearing receiver and the damper clamping.

10 Claims, 6 Drawing Sheets

PIVOT BEARING WITH TURNED DAMPER CLAMPING

BACKGROUND OF THE INVENTION

The invention concerns a pivot bearing for a wheel suspension, in particular for a front axle for a motor vehicle, containing a wheel bearing receiver, a steering arm, a spring strut receiver with a damper clamping and a carrier rib.

Pivot bearings constitute a connection between the damper or spring strut, the wheel bearing, the steering gear and the transverse control arm on the front axle of a motor vehicle.

DE 102 12 873 B4 discloses a pivot bearing in which the spring strut is inserted with its free lower end into a clamping ring provided on the pivot bearing, which clamping ring is tightened by means of a bolt-nut connection such that the pivot bearing is held securely on the lower end of the spring strut. The disadvantage of such a pivot bearing is the massive construction which has a high weight due to the extensive clamping oriented against the inside of the vehicle; this is undesirable in modern vehicles since the aim is to reduce fuel consumption.

DE 10 2005 040 101 A1 discloses a pivot bearing in which the clamping is formed by the two clamping rings arranged above each other. This is less massive, but precise production of the cone in the clamping rings to guarantee optimum accommodation of the spring strut is very costly to produce.

CH 659 442 discloses a pivot bearing which has the damper clamping arranged in the direction of the outside of the vehicle. However the bolt is arranged such that it intersects the spring strut tube in a segmented manner, which entails the disadvantage of additional deformation of the spring strut.

The object of the invention is to propose a pivot bearing and an associated method which allows optimum damper clamping and withstands the loads occurring. Due to the bionic formation, a weight-saving is also achieved. Furthermore the object is to produce a pivot bearing in a method which requires as few additional working steps as possible until the pivot bearing is ready for installation.

SUMMARY OF THE INVENTION

This object is achieved according to the invention in that the damper clamping of the spring strut receiver faces the vehicle outside and that the pivot bearing has an opening in the region between the wheel bearing receiver and the damper clamping, which opening serves for relative movement of the two clamp sides of the damper clamping in relation to each other, and the slot of the damper clamping is opened uninterruptedly by turning out the spring strut receiver.

Because the damper clamping of the spring strut receiver is arranged on the vehicle outside, the carrier rib for the damper clamping can be included, whereby additional protrusions or material thicknesses or material accumulations for the arrangement of bolts for damper clamping can be avoided. This allows a lighter pivot bearing, which by its optimised design however still fulfils the strength requirements. The carrier rib which serves for stability runs at right angles to the clamping element, so the carrier rib can be used as a support surface for the clamping element. In order for clamping of the spring strut receiver to be possible with the damper clamping, an opening is provided in the pivot bearing, located in the region between the wheel bearing receiver and the damper clamping. The opening serves for the relative movement of the two clamp sides of the damper clamping towards each other. The opening is formed so large that the pivot bearing meets the requirements for load-bearing capacity but nonetheless as much material or weight as possible can be saved. The optimum contour of the opening, on a component loading such as under the braking moments occurring, prevents induced stress peaks which would lead to premature fatigue rupture. As already mentioned, the support surface of the clamping element is formed by the carrier rib. The carrier rib, which as a base function serves to reinforce the pivot bearing, is utilised additionally and material for additional protrusions on the damper clamping can therefore be saved.

Also such a design allows further material to be saved on the opposite side of the damper clamping or on the vehicle inside of the pivot bearing, in that instead of a complete sleeve for the spring strut receiver, only webs are provided, preferably the spring strut receiver has two webs. The webs are spaced apart by a recess, advantageously the recess has an oval or slot-like form. A further advantageous effect of the webs is that the material accumulation is reduced or can be avoided by the absence of protrusions and thus the casting properties can be substantially improved. The pivot bearing is produced by casting, preferably ductile cast iron or aluminium is used. The possible casting methods used for production of the pivot bearing are sand-casting, chill-casting or die-casting.

To further stabilise the spring strut receiver on the pivot bearing, a carrier structure is used. Due to the two connecting points of the carrier structure which are arranged on the periphery of the spring strut receiver and preferably lie above each other in the direction of the centre axis of the spring strut receiver, a higher load-bearing capacity of the pivot bearing is achieved without much additional weight. Because of this carrier structure which has an open construction from a bionic aspect, the damper clamping is additionally reinforced, or due to the form of the carrier structure, a high deformation under braking moments or high loads is avoided.

On casting the pivot bearing, the spring strut receiver is cast such that the inner diameter after casting must be turned out to the required extent to receive the spring strut, and whereby at the same time an uninterrupted slot is produced. Before machining by turning out, the two clamp sides of the damper clamping are still connected together at the inner diameter and the slot is not yet uninterrupted, rather after the casting process it is initially a groove with a depth from the outer diameter of the spring strut receiver to the casting material to be turned out, which forms the groove base. By turning out, the material on the inner diameter is turned away until no material remains at the site of the groove or future slot and the slot is open uninterruptedly, whereby the damper clamping is ready for use.

BRIEF DESCRIPTION OF THE DRAWINGS

An embodiment example of the invention is described with reference to the figures, wherein the invention is not restricted merely to the embodiment example. The drawings show.

DETAILED DESCRIPTION

Figure 1:
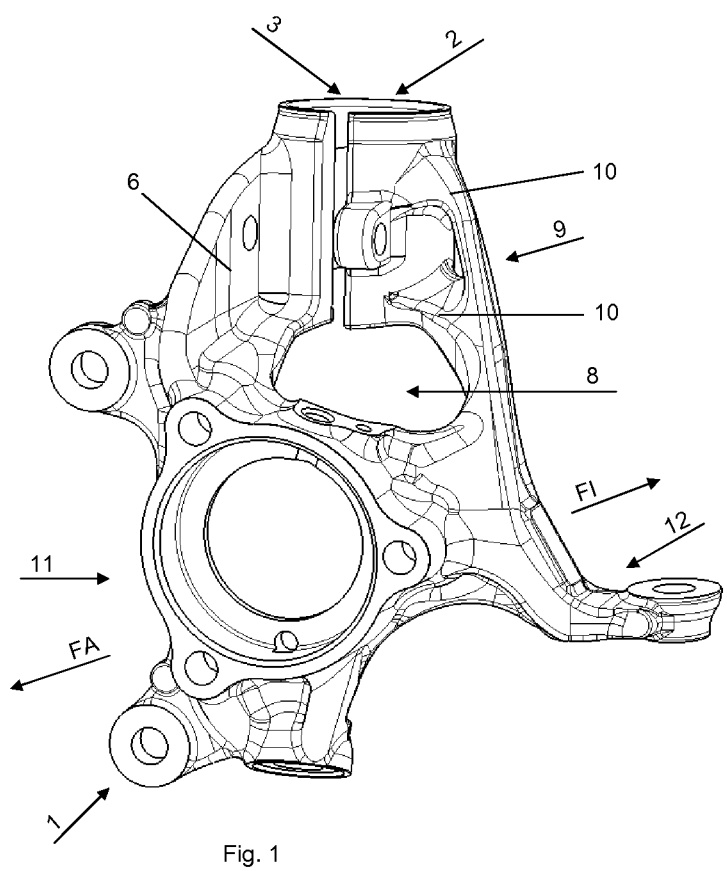
FIG. 1 a perspective view of a pivot bearing according to the invention.

FIG. 1 shows a pivot bearing 1 according to the invention. The wheel bearing receiver 11 serves for installation of a wheel bearing (not shown). The arrow directions FA and FI shown in the drawings point respectively towards the vehicle outside FA and the vehicle inside FI when the pivot bearing 1 is in fitted state. The spring strut receiver 2 arranged on the pivot bearing 1 serves for fixing of the spring strut or shock absorber (not shown). The damper clamping 3 on the pivot bearing 1 according to the invention is arranged on the spring strut receiver 2 in the direction of the vehicle outside FA. In conventional pivot bearings, the clamping usually takes place on the vehicle inside of the pivot bearing. In order to make the pivot bearing 1 as light as possible, all unnecessary material has been omitted and existing structures are utilised repeatedly in their function. Thus the carrier rib 6 also serves as a support surface 14 for the clamping element 13. Firstly this avoids additional protrusions for fixing the clamping element on the spring strut receiver in the direction of the vehicle inside FI as known from the prior art, and secondly existing carrier ribs 6 which serve for stabilisation and reinforcement of the pivot bearing 1 or spring strut receiver 2 can be utilised for a further function. The carrier rib 6 or receiver surface 14 preferably runs tangential to the outer diameter of the spring strut receiver 2.

Figure 2:
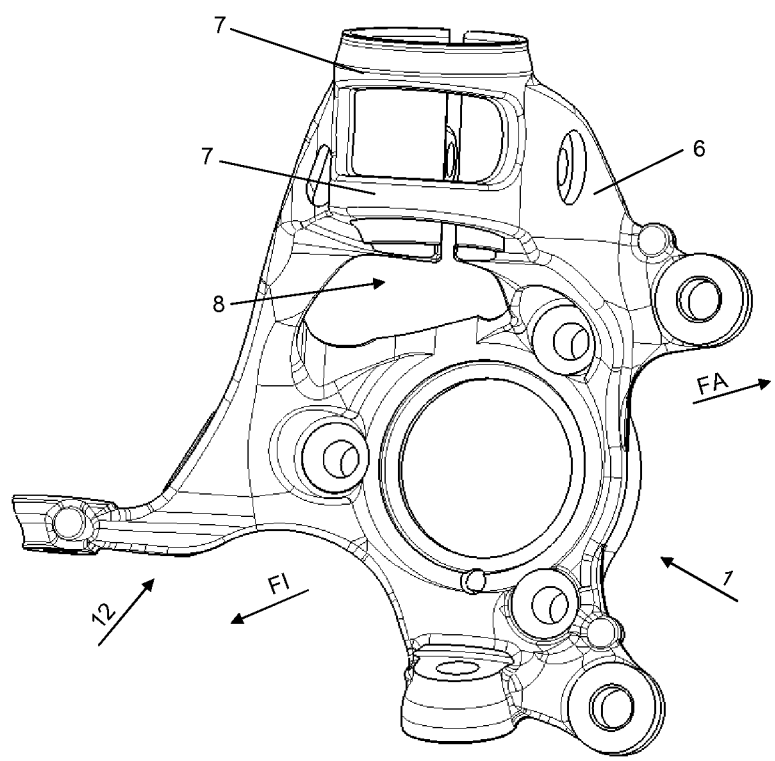
FIG. 2 a perspective view of a pivot bearing according to the invention.
Figure 5:
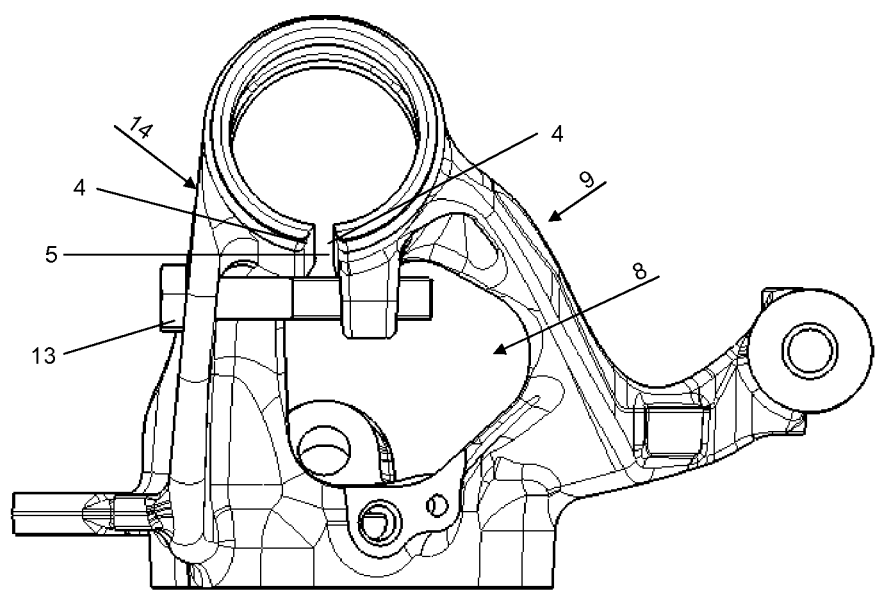

The carrier rib 6 is arranged at right angles to the clamping element 13, leading to an even distribution of force on the spring strut clamping. The clamping element 13 is preferably a bolt, as shown from FIGS. 3 and 5, but other clamping elements are also conceivable. The damper clamping 3 of the pivot bearing 1 according to the invention has a slot 5 which allows the clamping of the spring strut in the pivot bearing 1. By tightening using the clamping element 13, the clamp sides 4 move together, whereby the inner diameter of the spring strut receiver 2 is constricted and hence the spring strut is clamped. The opening 8 arranged in the region between the wheel bearing receiver 11 and the damper clamping 3 serves for relative movement of the two clamp sides 4. This means that the opening 8 allows clamping together, whereby the two clamp sides 4 can be moved towards each other. The opening 8 is preferably formed as large as possible to prevent unnecessary weight of the pivot bearing 1, but nonetheless only large enough for the pivot bearing 1 to withstand the necessary loads. The form or contour of the opening 8 is designed such that in the case of braking or under load, no induced stress peaks occur in the pivot bearing 1 which would overstress the pivot bearing 1. FIG. 5 shows the optimum contour of the opening 8 and spring strut receiver 2. In order to avoid a high deformation of the pivot bearing 1 or spring strut receiver 2 under load, e.g. under braking moments, as a reinforcement a carrier structure 9 is provided on the spring strut receiver 2 which is arranged on the outer diameter of the spring strut receiver 2 through two connecting points 10 of the carrier structure. The connecting points 10 of the carrier structure preferably lie above each other in the direction of the centre axis of the spring strut receiver 2. The carrier structure 9 runs together starting from the two connecting points 10 of the carrier structure in the direction of the steering arm 12. With this form or structure of the carrier structure 9, the weight of the pivot bearing 1 is greatly reduced in comparison with pivot bearings known from the prior art which also have reinforcement to prevent high deformation, as the open-work structure of the carrier structure 9 of the pivot bearing 1 according to the invention entails weight savings. The spring strut receiver 2 on the opposite side of the damper clamping 3 or in the direction of the vehicle inside FI has two continuous webs 7 in the peripheral direction of the centre axis of the spring strut, which surround the spring strut of the shock absorber (not shown). Preferably the recess 15 between the webs 7 is formed oval or slot-like. Due to the recess 15 or the two webs 7, the weight of the pivot bearing 1 is further reduced. FIG. 2 shows the webs 7 which are preferably arranged on the upper and lower edge of the spring strut receiver. Also a different number of webs 7 is conceivable. The form of the recess 15 lying in-between is optimised such that there too, in case of load, no induced stress peaks occur.

Figure 3:
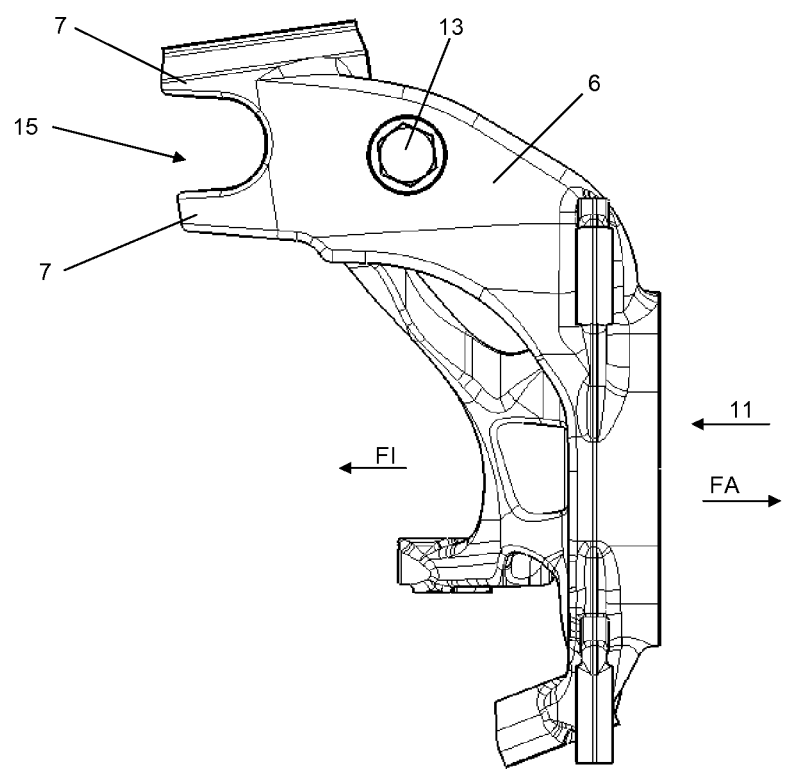
FIG. 3 a side view of a pivot bearing according to the invention with installed clamping element, FIG. 4 a side view of a pivot bearing according to the invention, FIG. 5 a top view of a pivot bearing according to the invention with installed clamping element, and FIG. 6 a top view of a pivot bearing according to the invention before machining by turning out.

FIG. 3 shows a side view of the pivot bearing 1 according to the invention in which a clamping element 13 is inserted. Preferably a bolt is used for this. The head of the clamping element 13 lies on the support surface 14 of the carrier rib 6. Thus the carrier rib 6 serves for damper clamping 3 and for stabilisation or strengthening of the pivot bearing 1 or spring strut receiver 2.

Figure 4:
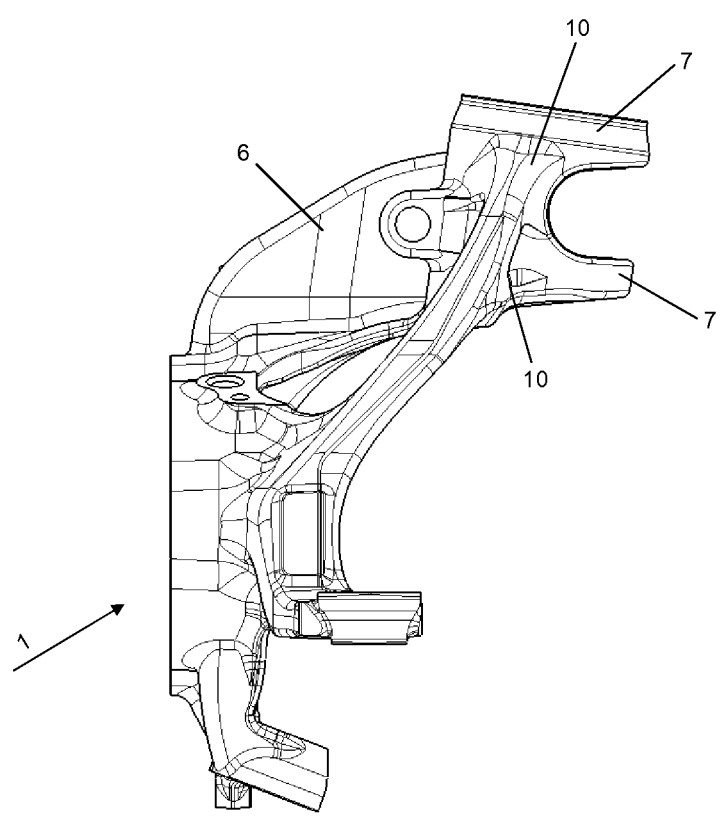

The contour of the carrier structure 9 and the arrangement of the connecting points 10 of the carrier structure can also be seen in FIG. 4.

Figure 6:
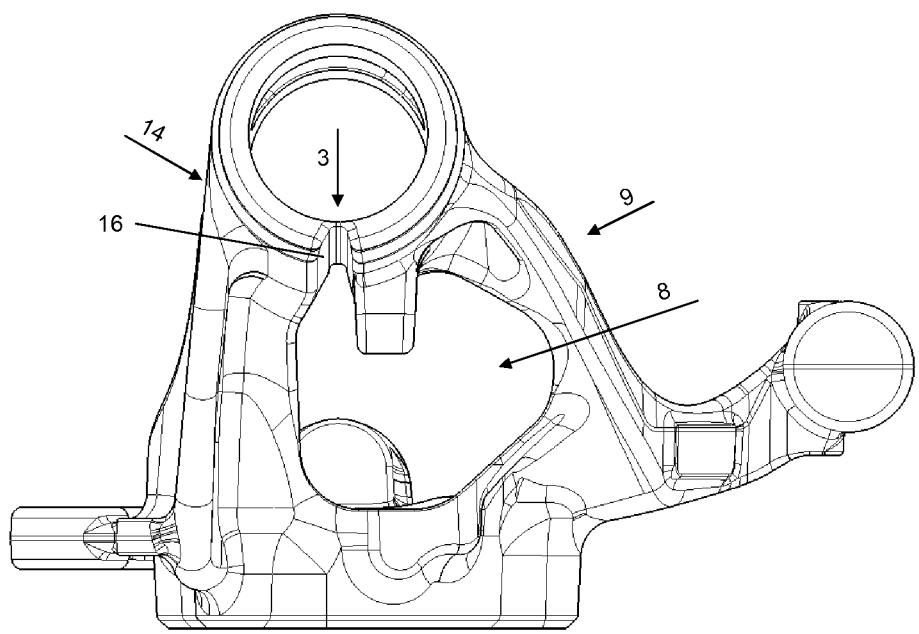

FIG. 6 shows the pivot bearing 1 before machining of the spring strut receiver 2 by turning out the inner diameter. By turning out the inner diameter, this is enlarged whereby the wall thickness is reduced. In the region of the groove 16 the wall of the spring strut receiver 2 has been removed completely, whereby the groove 16 becomes an uninterrupted slot 5, allowing the clamp sides 4 to be clamped together.

The invention claimed is:

1. Pivot bearing for a wheel suspension for a motor vehicle, comprising a wheel bearing receiver, a steering arm, a spring strut receiver with a damper clamping and a carrier rib, wherein the damper clamping of the spring strut receiver faces a vehicle outside and the pivot bearing has an opening in the region between the wheel bearing receiver and the damper clamping.

2. Pivot bearing according to claim 1, wherein the carrier rib forms the support surface for the clamping element of the damper clamping.

3. Pivot bearing according to claim 1, wherein the side of the spring strut receiver facing a vehicle inside has at least one web.

4. Pivot bearing according to claim 3, wherein the web runs in a peripheral direction of a centre axis of the spring strut.

5. Pivot bearing according to claim 1, wherein the side of the spring strut receiver facing a vehicle inside has two webs.

6. Pivot bearing according to claim 5, wherein the webs are arranged on upper and lower ends, respectively, of the spring strut receiver.

7. Pivot bearing according to claim 1, wherein the pivot bearing is made of one of ductile cast iron and aluminium.

8. Pivot bearing according to claim 1, wherein the pivot bearing has a carrier structure which is arranged on an outer diameter of the spring strut receiver through two connecting points of the carrier structure.

9. Pivot bearing according to claim 8, wherein the two connecting points of the carrier structure are arranged above each other in a direction of a centre axis of the spring strut receiver.

10. Method for production of a pivot bearing according to claim 1, wherein a slot of the damper clamping is opened uninterruptedly by turning out the spring strut receiver.

* * * * *